(12) United States Patent
Tucker

(10) Patent No.: US 10,493,527 B1
(45) Date of Patent: Dec. 3, 2019

(54) SYSTEM FOR ADDITIVE MANUFACTURING

(71) Applicant: General Electric Company, Schenectady, NY (US)

(72) Inventor: Michael Robert Tucker, Niskayuna, NY (US)

(73) Assignee: GENERAL ELECTRIC COMPANY, Niskayuna, NY (US)

(*) Notice: Subject to any disclaimer, the term of this patent is extended or adjusted under 35 U.S.C. 154(b) by 0 days.

(21) Appl. No.: 15/974,475

(22) Filed: May 8, 2018

(51) Int. Cl.
| | | |
|---|---|---|
| *B05C 11/04* | (2006.01) | |
| *B22F 3/105* | (2006.01) | |
| *B28B 1/00* | (2006.01) | |
| *B33Y 30/00* | (2015.01) | |
| *B33Y 40/00* | (2015.01) | |

(52) U.S. Cl.
CPC .......... *B22F 3/1055* (2013.01); *B05C 11/045* (2013.01); *B28B 1/001* (2013.01); *B22F 2003/1057* (2013.01); *B22F 2003/1058* (2013.01); *B33Y 30/00* (2014.12); *B33Y 40/00* (2014.12)

(58) Field of Classification Search
None
See application file for complete search history.

(56) References Cited

U.S. PATENT DOCUMENTS

| | | | |
|---|---|---|---|
| 6,336,480 B2 | 1/2002 | Gaylo et al. | |
| 8,021,138 B2 | 9/2011 | Green | |
| 9,486,962 B1 | 11/2016 | Dugan et al. | |
| 2003/0197076 A1 | 10/2003 | Iwamoto et al. | |
| 2011/0223349 A1* | 9/2011 | Scott | B22F 3/1055 427/532 |
| 2014/0314609 A1* | 10/2014 | Ljungblad | B22F 3/1055 419/1 |
| 2016/0193695 A1 | 7/2016 | Haynes | |
| 2016/0236277 A1 | 8/2016 | Doherty et al. | |
| 2016/0325503 A1* | 11/2016 | Mironets | B22F 3/1055 |
| 2017/0333990 A1 | 11/2017 | Garry | |

* cited by examiner

*Primary Examiner* — Jethro M. Pence
(74) *Attorney, Agent, or Firm* — Fletcher Yoder, P.C.

(57) ABSTRACT

An additive manufacturing system for printing an article including a build plate having a build surface between an inner radius and an outer radius that may receive powder particles and a recoating assembly that may distribute the powder particles onto the build surface to form a build layer of the article. The recoating assembly includes a support jig having a first end, a second end, and a support wall extending between the first and second ends and a recoater blade coupled to the second end and extending along at least a portion of a length of the support wall. A shape of the recoater blade is such that, when the recoater blade is positioned against the build surface, an angle between the recoater blade and a tangent at each radii of the build plate is substantially constant.

12 Claims, 6 Drawing Sheets

SYSTEM FOR ADDITIVE MANUFACTURING

BACKGROUND

The subject matter disclosed herein generally relates to additive manufacturing systems, and more particularly, to recoating assemblies for use in additive manufacturing systems.

Additive manufacturing, also known as 3D printing, generally involves printing an article one layer at a time using specialized systems. In particular, a layer of a material (e.g., a metal and/or ceramic powder bed) may be deposited on a working surface and bonded with another layer of the same or a different material. Additive manufacturing may be used to manufacture articles (e.g., fuel nozzles, fuel injectors, turbine blades) from computer aided design (CAD) models using techniques such as, but not limited to, metal laser melting, laser sintering, and binder jetting. These additive manufacturing techniques melt, sinter, or chemically bind layers of material to generate the desired article. Additive manufacturing may facilitate manufacturing of complex articles and enable flexibility for customization of articles compared to techniques such as molding (e.g., cast molding, injection molding). Additionally, additive manufacturing can reduce the overall manufacturing costs associated with generating these complex articles compared to molding techniques generally used.

BRIEF DESCRIPTION

In one embodiment, an additive manufacturing system for printing an article including an build plate having a build surface between an inner radius and an outer radius that may receive powder particles and a recoating assembly that may distribute the powder particles onto the build surface to form a build layer of the article. The recoating assembly includes a support jig having a first end, a second end, and a support wall extending between the first and second ends and a recoater blade coupled to the second end and extending along at least a portion of a length of the support wall. A shape of the recoater blade is such that, when the recoater blade is positioned against the build surface, an angle between the recoater blade and a tangent at each radii of the build plate is substantially constant.

In a second embodiment, a recoating assembly for use in a rotary additive manufacturing system including a support jig having a first end, a second end, and a support wall extending between the first and second ends and a recoater blade that may distribute powder particles onto a build plate of the rotary additive manufacturing system while the build plate is rotating to form a build layer of an article to be printed. The recoating blade is coupled to the second end and includes a shape having a curvature.

In a third embodiment, an additive manufacturing system including a build platform having an annular build plate and a workstation including a particle delivery system that may deposit powder particles onto a surface extending between an inner radius and an outer radius of the build plate and a recoating assembly that may distribute the powder particles onto the surface. The recoating assembly includes a support jig and a recoater blade coupled to the support jig and having a wall having a first face and a second face substantially opposite the first face. The first face is shaped such that, when the recoater blade is positioned adjacent to the surface, an angle between the recoater blade and a tangent at each radii of the build plate is substantially constant.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
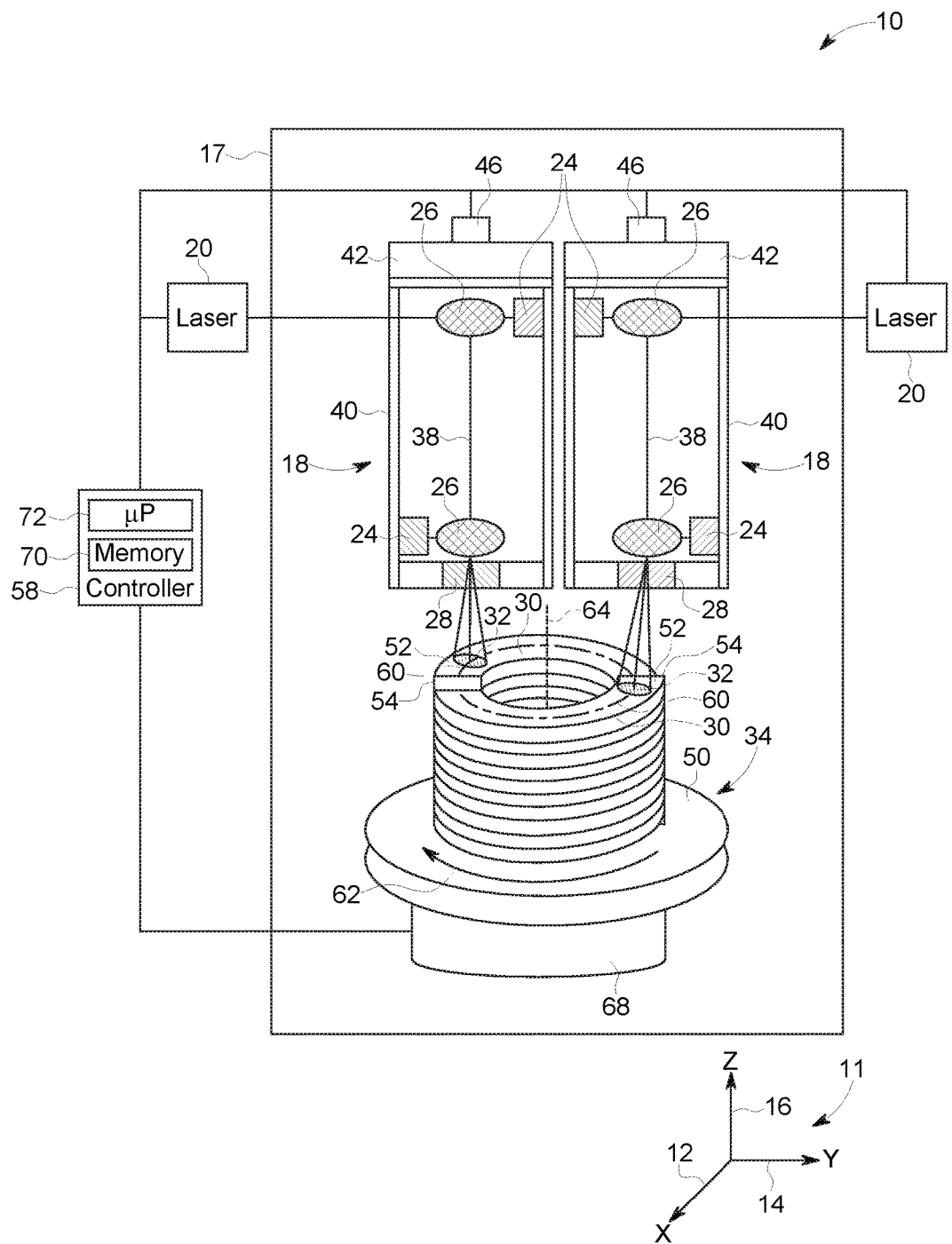
FIG. 1 is a schematic view of a continuous additive manufacturing system, in accordance with an embodiment of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As used herein, a "working surface" is intended to denote a surface onto which a powder bed layer may be deposited during an additive manufacturing process. As used herein, a "straight recoater blade" is intended to denote a recoater blade that is substantially non-curved along its entire length and width. As used herein, a "curved recoater blade" is intended to denote a recoater blade having at least one face that is non-linear along a portion of its length and width.

There are several techniques for manufacturing articles, such as ceramic and/or metal parts used in a variety of machinery. For example, molding techniques such as sand molding, cast molding, and/or injection molding, among others, may be used to manufacture parts for machinery applications. As noted above, other techniques that may be used to manufacture parts include additive manufacturing. Some additive manufacturing systems involve the consolidation of a particulate material to make an article. Such techniques facilitate producing complex articles from materials that may otherwise be unsuitable for use with other manufacturing techniques (e.g., molding) due to cost and/or material properties. Accordingly, additive manufacturing techniques may be advantageous for fabricating parts compared to molding techniques due, in part, to the flexibility of materials that may be used for fabricating the article, the ability to manufacture more complex articles, and lower manufacturing costs.

By way of non-limiting example, additive manufacturing systems that may be used to manufacture articles of interest include Direct Metal Laser Melting (DMLM), Selective Laser Melting (SLM), Direct Metal Laser Sintering (DMLS), LaserCusing®, and binder jet systems. These systems fabricate articles using a focused energy source, such as a laser or an electron beam generator. As discussed in further detail below, the energy source may direct an energy beam onto a layer of a particulate material (e.g., powder particles) deposited on a working surface (e.g., a build plate or previously deposited powder bed layer). The energy beam may melt or sinter particles of the build material to facilitate consolidation of the particles and generate the article of interest. In certain additive manufacturing systems, a new build layer of the particulate material is formed when a recoating device is used to recoat a deposited build layer with additional particulate material after each build layer is impinged by the energy beam. Each step of the build process may be performed sequentially and distinctly within a particulate material bed, and the build time of the article is limited by the particulate deposition, distribution, and consolidation times for each build layer of the article.

In additive manufacturing systems such as DMLM and DMLS systems, a recoating blade may be used to distribute, meter, and smooth a new layer of the powder particles onto the working surface. During manufacturing of the article, the working surface (e.g., a build plate of the additive manufacturing system) may rotate about an axis and/or translocate to facilitate forming a powder bed of the powder particles and to position the desired areas of the powder bed in the path of the energy beam. The recoating assembly includes a recoater blade that distributes the powder particles onto the working surface as the build plate rotates about the axis. The manner by which the recoating blade distributes the powder particles onto the working surface to form the powder bed can substantially affect the geometry of containment walls and/or the article being printed.

For example, during the manufacturing process, a containment wall (e.g., an outer wall) is built at each powder layer to hold the powder particles in place on the working surface. Certain recoater blade configurations may be unable to distribute and meter the powder particles evenly across the working surface. For example, when using straight recoater blades, a leading edge of the distributed powder particles may be curved. The curvature of the leading edge of the distributed powder particles can limit the lateral and radial distribution of the powder particles, such that the powder particles may not be spread evenly along the working surface. Accordingly, a geometry of the containment wall may be limited. Additionally, if a disruption (e.g., area having no powder particles, discontinuous powder bed layer) in the containment wall of a previously deposited powder layer occurs, certain recoater blade configurations may be unable to distribute the powder particles of the subsequent powder bed layer in a manner that fills-in the disruption such that the deposited powder bed layer is continuous along the lateral and radial directions of the working surface. As such, the containment wall may have a breach and the powder particles seep out of the containment wall. Moreover, certain existing recoater blade configurations distribute the powder particles past a boundary of the working surface (e.g., past an outer edge of the build plate). Therefore, a portion of the powder particles fall off the working surface and are unavailable for use in the build process. Accordingly, the overall manufacturing cost of the 3D printing the article may be increase due, in part, to loss and increase usage of build material (e.g., the powder particles).

Furthermore, the build plate of the additive manufacturing system may include surface features (e.g., screw/bolt and/or openings/holes) to facilitate coupling the build plate to the build platform and/or for movement (e.g., rotation and/or translocation) during the additive manufacturing process. During deposition of the powder particles onto the working surface to form the powder bed layer, the surface features of the build plate may create sink holes that result in a discontinuous powder bed. For example, a portion of the powder particles may fall into the openings/holes on the build plate as the recoater blade distributes the powder particles along the working surface, thereby creating a sink hole in the powder bed layer. Existing recoater blade configurations are unable to distribute the powder past the portion of the powder bed that has the sink hole. Accordingly, the disruption in the powder bed layer propagates to the subsequent powder bed layers of the article being printed. Consequently, the overall properties (e.g., physical and mechanical properties) of the printed article may not be desirable.

It is presently recognized that a rate of powder distribution from an inner radius to the outer radius the working surface, and vice versa, is based on the configuration of the recoater blade. For example, the rate of powder distribution in the lateral and radial directions along the working surface may vary based on an angle of the recoater blade relative to a tangent at a given radius of the working surface. That is, a velocity at which the recoater blade distributes the powder particles along the working surface to form the powder bed layer depends on the angle of the recoater blade relative to the build plate. Therefore, if the angle of the recoater blade varies relative to the tangent along each radii of the build plate, the rate of powder distribution from the inner radius to the outer radius of the working surface will also vary.

The variation in the rate of powder distribution along the working surface may not allow the recoater blade to move the powder particles past the areas of the powder bed layer where the disruptions are located. For example, straight recoater blades create a variable angle relative to the tangent at a given radius of the build plate from the inner radius to the outer radius of the build plate. Accordingly, the rate at which the straight recoater blade distributes (e.g., spreads)

the powder particles along the working surface varies depending on where along a radius of the working surface the straight recoater blade is distributing the powder particles at a given time. This results in uneven distribution of the powder particles, such that the disruptions in the powder bed layer and/or containment wall may be difficult to fill with additional powder.

In addition, as discussed above, the variation in the angle of the straight recoater blade relative to the tangent at each radii of the working surface creates a curved leading edge of the powder bed layer. The curved leading edge may limit the steepness, and consequently the geometry, of the containment wall. It has been recognized that by using a recoating blade having a geometry that creates a constant angle between the recoater blade and a tangent at each radii across the working surface, an even distribution of the powder along the working surface may be achieved. Additionally, increasing the rate of powder distribution in a lateral direction (rather than in a radial direction) may distribute the powder particles in a manner that enables filling-in of disruptions in the powder bed layer created by surface features of the build plate and/or breaches in the containment walls. Disclosed herein is a recoating assembly having a non-linear recoater blade that may be used to substantially evenly distribute the powder particles across the working surface to mitigate propagation of disruptions in downstream layers of the powder bed layer during additive manufacturing of an article of interest.

With the foregoing in mind, FIG. 1 is a schematic view of an embodiment of a continuous additive manufacturing system 10 for manufacturing an article (e.g., a consolidated metal or ceramic part) using a recoating assembly having a non-linear recoater blade that may evenly distribute powder particles along a working surface. To facilitate discussion of certain aspects of the continuous additive manufacturing system 10, reference is made to a coordinate system 11 having an x-axis or direction 12, a y-axis or direction 14, and a z-axis or direction 16, the axes 12, 14, and 16 being orthogonal to one another. The continuous additive manufacturing system 10 includes an enclosure 17 that houses various components of the continuous additive manufacturing system 10, and that also maintains an inert atmosphere during the additive manufacturing processes.

The continuous additive manufacturing system 10 includes two consolidation units 18 positioned within the enclosure 17. However, the continuous additive manufacturing system 10 may include any number of consolidation units 18 such as, for example, 1, 2, 3, 4, 5, or more consolidation units 18. Each consolidation unit 18 includes a respective laser device 20, a respective scanning motor 24, a respective scanning mirror 26, and a respective scanning lens 28 for fabricating an article 30 using a layer-by-layer manufacturing process (e.g., DMLM/DMLS). Alternatively, each consolidation unit 18 may include any component that facilitates consolidation of a material (e.g., metal and/or ceramic) using any of the processes and systems described herein.

Each laser device 20 provides a high-intensity energy source that generates a respective melt pool 32 (not shown to scale) in a deposited powdered material on a build platform 34 using an energy beam 38. Each laser device 20 is coupled to the respective consolidation unit 18 using a fiber optic cable. A housing 40 of each respective consolidation unit 18 is coupled to a respective mounting system 42. Each mounting system 42 is moved by a respective actuator or an actuator system 46 that moves each mounting system 42 in the directions 12, 14, and 16 to cooperate with each scanning mirror 26 and facilitate fabricating a layer of the article 30. For example, each mounting system 42 can be pivoted about a central point, moved in a linear path, a curved path, and/or rotated to cover an annular build plate 50 of the build platform 34 with a desired portion of the powder particles. The movement of each mounting system 42 facilitates directing each energy beam 38 along a surface of a plurality of powder particles 52 of a build layer 54 to form a layer of the article 30. Alternatively, the housing 40 and the energy beam 38 are moved in any suitable orientation and manner that enables the continuous additive manufacturing system 10 to selectively direct each energy beam 38 to a desired portion of the build layer 54 and to generate the desired geometry of the article 30.

Each scanning motor 24 is controlled by a controller 58 to move at each mirror 26 such that each energy beam 38 is reflected to be incident along a predetermined path along the build platform 34 (e.g., a linear and/or rotational scan path 60). In the illustrated embodiment, a combination of the scanning motor 24 and the scanning mirror 26 forms a two-dimension scan galvanometer. Alternatively, the scanning motors 24 and the scanning mirrors 26 may include a three-dimension (3D) scan galvanometer, dynamic focusing galvanometer, and/or any other method that may be used to deflect the energy beam 38 of the laser device 20.

The annular build plate 50 is rotated in a rotation direction 62 about a platform axis 64 (e.g., a longitudinal axis or the Z-axis 16) by an actuator system 68 to facilitate continuous deposition, distribution, and consolidation of the plurality of powder particles 52. As described above with respect to the mounting system 42, the actuator system 68 may also move the build platform 34 in the direction corresponding to the X-axis 12 to facilitate consolidation of the build layer 54 on top of a previously consolidated build layer 54. In some embodiments, the actuator system 68 may also move the build platform 34 in the XY plane. For example, in certain embodiments, the housing 40 may be stationary. Accordingly, the actuator system 68 rotates the annular build plate 50 in the direction 62 and in the directions 12, 14 to allow each scanning motor 24 and each scanning mirror 26 to direct each energy beam 38 along the scan paths 60 about the annular build plate 50. By way of non-limiting example, the actuator system 68 may include a linear motor(s), a hydraulic and/or pneumatic piston(s), a screw drive mechanism(s), and/or a conveyor system to facilitate movement and rotation of the build platform 34.

As discussed above, the controller 58 controls operation of the continuous additive manufacturing system 10 to generate the article 30. The controller 58 may include a distributed control system (DCS) or any computer-based workstation that is fully or partially automated. For example, the controller 58 can be any suitable device employing a general purpose computer or an application-specific device, which may generally include memory circuitry 70 storing one or more instructions for controlling operation of the continuous additive manufacturing system 10. The memory circuitry 70 may store computer-aided designs (CAD) representative of a structure of the article being printed. The controller 58 may include one or more processing devices (e.g., microprocessor 72) for executing the instructions stored in the memory circuitry 70, and the memory circuitry 70 may include one or more tangible, non-transitory, machine-readable media collectively storing instructions executable by the processor to control actions of the continuous additive manufacturing system 10, as described herein.

In operation the controller 58 of the continuous additive manufacturing system 10 converts the CAD file of the article 30 into a layer-by-layer format that includes a plurality of build parameters for each layer of the article 30 (e.g., the build layer 54 of article 30 including the plurality of powder particles 52 to be consolidated). In the illustrated embodiment, the article 30 is modeled in a desired orientation relative to the centerline axis 64. The geometry of the article 30 is sliced into a stack of continuous helical layers of a desired thickness, such that the geometry of each layer is an outline of a cross-section through the article 30 at that particular layer location. The scan paths 60 are generated across the geometry of a respective layer. The build parameters are applied along the scan path 60 to fabricate that layer of the article 30 from the plurality of powder particles 52 used to construct the article 30. The steps are repeated for each respective layer in the continuous helical layer of the article 30 geometry. Once the process is completed, an electronic representation of the scan paths 60 is generated, including all of the layers. The electronic representation of the scan paths 60 is loaded into controller 58 of the continuous additive manufacturing system 10 to control the system during fabrication of each layer.

After the electronic representation of the scan paths 60 is loaded into controller 58, the continuous additive manufacturing system 10 is operated to generate the article 30 by implementing the layer-by-layer manufacturing process, such as a direct metal laser melting (DMLM) method, in a rotary manner, effecting a helical structure in the article 30, for example. The layer-by-layer additive manufacturing process does not require the use of a pre-existing article as the precursor to the final component, rather the process produces the article 30 from a raw material in a configurable form, such as the plurality of powder particles 52. For example, a steel article 30 can be additively manufactured using a steel powder. The continuous additive manufacturing system 10 enables fabrication of articles, such as the article 30, using a broad range of materials. By way of non-limiting example, the materials used for manufacturing the article 30 include metals, ceramics, glass, polymers, and combinations thereof.

Figure 2:
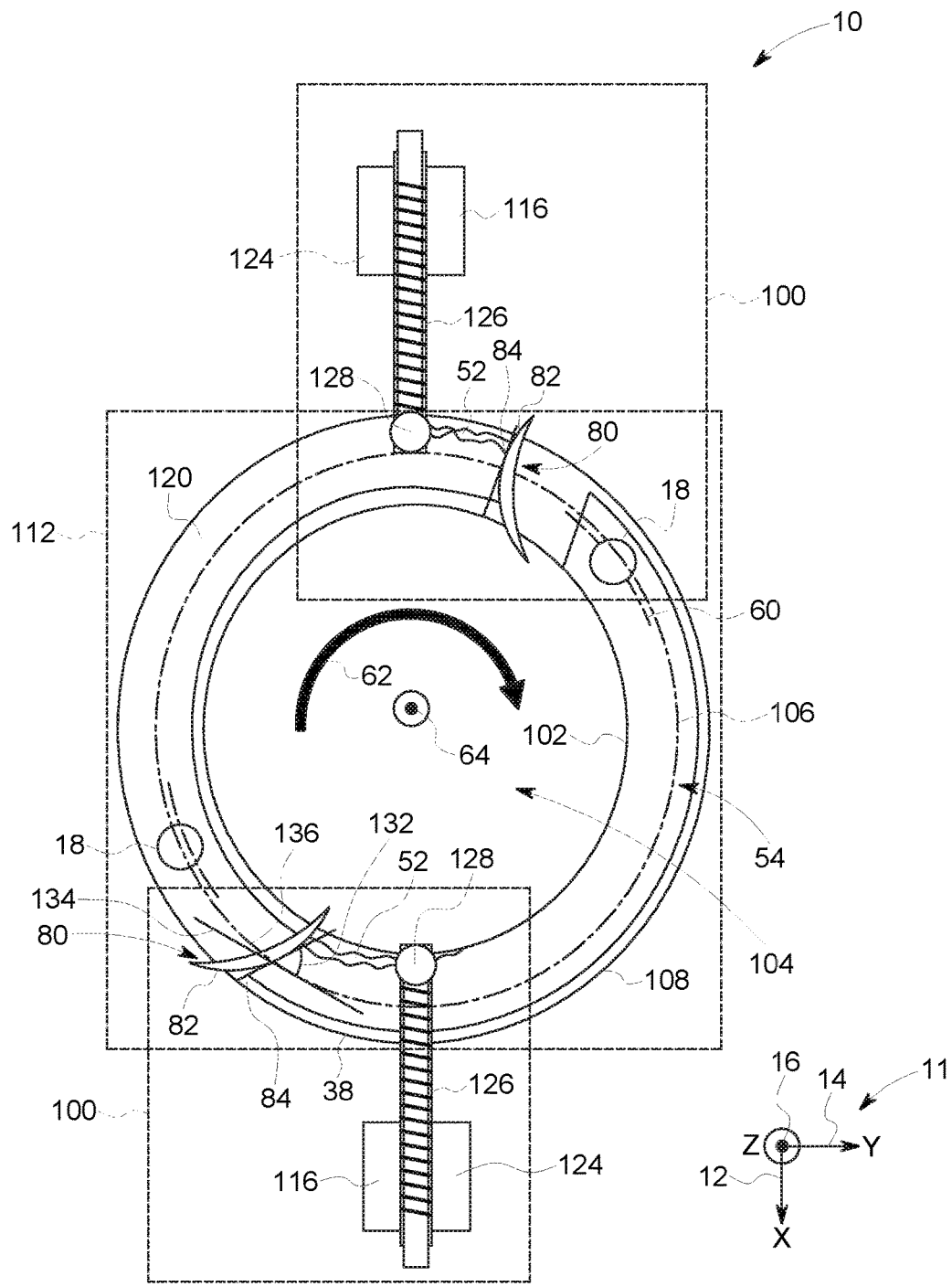
FIG. 2 is a schematic top view of a build platform and workstation of the continuous additive manufacturing system of FIG. 1, the workstation having a recoating assembly including a curved recoater blade, in accordance with an embodiment of the present disclosure.

FIG. 2 is a top schematic view of an embodiment of the continuous additive manufacturing system 10 that includes a recoating assembly 80 having at least one curved recoater blade 82. As discussed in further detail below, the curved recoater blade 82 facilitates substantially even distribution of the powder particles 52 to mitigate disruptions in the build layer 54 by creating a substantially constant angle relative to a tangent at each radii of the annular build plate 50. As such, radial transport of the powder particles 52 may be substantially even along the radius of the annular build plate 50. For example, a leading edge 84 of the powder particles 52 may move in a straight line, rather than a curved line, along the radius of the annular build plate 50 during spreading of the powder particles 52 to form the build layer 54. As used herein, the straight line is intended to denote a line that is radially oriented with respect to the platform axis 64 and orthogonal to each radii (e.g., the radii 136) of the annular build plate 50. The recoating assembly 80 may be positioned within a workstation 100 of the continuous additive manufacturing system 10.

In the illustrated embodiment, the continuous additive manufacturing system 10 includes two workstations 100. However, the continuous additive manufacturing system 10 may have any number of workstations 100 such as, for example, 1, 2, 3, 4, 5, or more workstations 100 circumferentially spaced apart along a circumference of the build platform 34. Each workstation 100 includes the consolidation unit 18, a particle delivery unit 116, and at least one recoating assembly 80. The shape and arrangement of the annular build plate 50 in FIG. 2 and the workstations 100, may have any configuration that enables the continuous additive manufacturing system 10 to manufacture the article 30. In the illustrated embodiment, the annular build plate 50 is a circular disc. However, in certain embodiments, the annular build plate 50 may have any other suitable geometric shape such as rectangular, elliptical, oval, or polygonal. An inner radius 102 of the annular build plate 50 defines a central annulus 104 (e.g., open portion). The annular build plate 50 provides a continuous workflow path 106 between the inner radius 102 and an outer radius 108, and rotates in the rotation direction 62 about the platform axis 64.

Additionally, the annular build plate 50 has a platform plane 112 that is orthogonal to the Z-axis 16. For example, the platform plane 112 may be oriented at an angle relative to the Z-axis 16 that is between approximately 85 degrees and approximately 275 degrees. However, the platform plane 112 may be oriented at any other suitable angle that facilitates operation of the continuous additive manufacturing system 10, as described herein.

The workstations 100 may be stationary units that are axially spaced apart from the annular build plate 50 along the Z-axis 16 by a workstation height (e.g., a distance between the annular build plate 50 and the respective workstation 100). The annular build plate 50 may move along the Z-axis 16 relative to workstations 100 to adjust the workstation height. However, in certain embodiments, the workstations 100 may be movable along the Z-axis 16, such that movement of the workstations 100, rather than the annular build plate 50, adjusts the workstation height. Movement of both the workstations 100 and the annular build plate 50 are also within the scope of the present disclosure. Each workstation 100 includes at least one particle delivery unit 116, at least one recoating assembly 80, and at least one consolidation unit 18. In alternative embodiments, the workstations 100 may include any type and number of devices and recoating assemblies that facilitate operation of the continuous additive manufacturing system 10 as described herein.

In operation, each particle delivery unit 116 deposits the powder particles 52 on a surface 120 of the annular build plate 50 at a rate that may be controlled to facilitate forming each build layer 54 of the article 30 by the continuous additive manufacturing system 10. In particular, each particle delivery unit 116 deposits the powder particles 52 on an area of the surface 120 that allows the recoating assembly 80 to distribute, meter and level (e.g., smooth) the powder particles 52 and form the build layer 54. The particle delivery unit 116 may include a particle hopper 124, a particle feeder 126, and a feed restrictor or nozzle 128. In one embodiment, the particle delivery unit 116 is a screw-feed particle delivery unit, which includes the particle hopper 124, a screw-type feeder (e.g., the particle feeder 126), a telescoping guide tube, and the nozzle 128. In other embodiments, the particle delivery unit 116 may be a fixed orifice funnel particle delivery unit that deposits the powder particles 52 on the surface 120 at a constant rate, a valved variable orifice particle delivery unit that deposits the powder particles 52 on the surface 120 at varying rates, a vibrating channel particle delivery unit that vibrates to facilitate transferring the powder particles 52 from the particle hopper 124 to the surface 120, a gas-blown particle delivery unit that uses a pressurized gas to entrain and deposit the powder particles 52 on the surface 120, or a conveyor particle delivery unit that uses a conveyor to deposit the powder particles 52 on the surface 120.

Each recoating assembly 80 includes features that facilitate distribution, metering, and smoothing of the powder particles 52 along the annular build plate 50, thereby forming the build layer 54. For example, once deposited onto the annular build plate 50, each recoating assembly 80 mechanically redistributes the powder particles 52 across the surface 120 as the annular build plate 50 rotates in the rotational direction 62. As discussed above, each recoating assembly 80 evenly distributes the powder particles 52 both laterally and radially on the annular build plate 50. For example, the respective curved recoater blade 82 of each recoating assembly 80 is shaped such that the curved recoater blade 82 forms a constant angle 132 relative to a tangent 134 at each radii 136 of the annular build plate 50 that is between the inner radius 102 and the outer radius 108. In this way, each disclosed recoating assembly 80 distributes (e.g., spreads) the powder particles 52 such that a consistent lateral and radial distribution and depth of the powder particles 52 across the annular build plate 50 is achieved to form the build layer 54.

Figure 3:
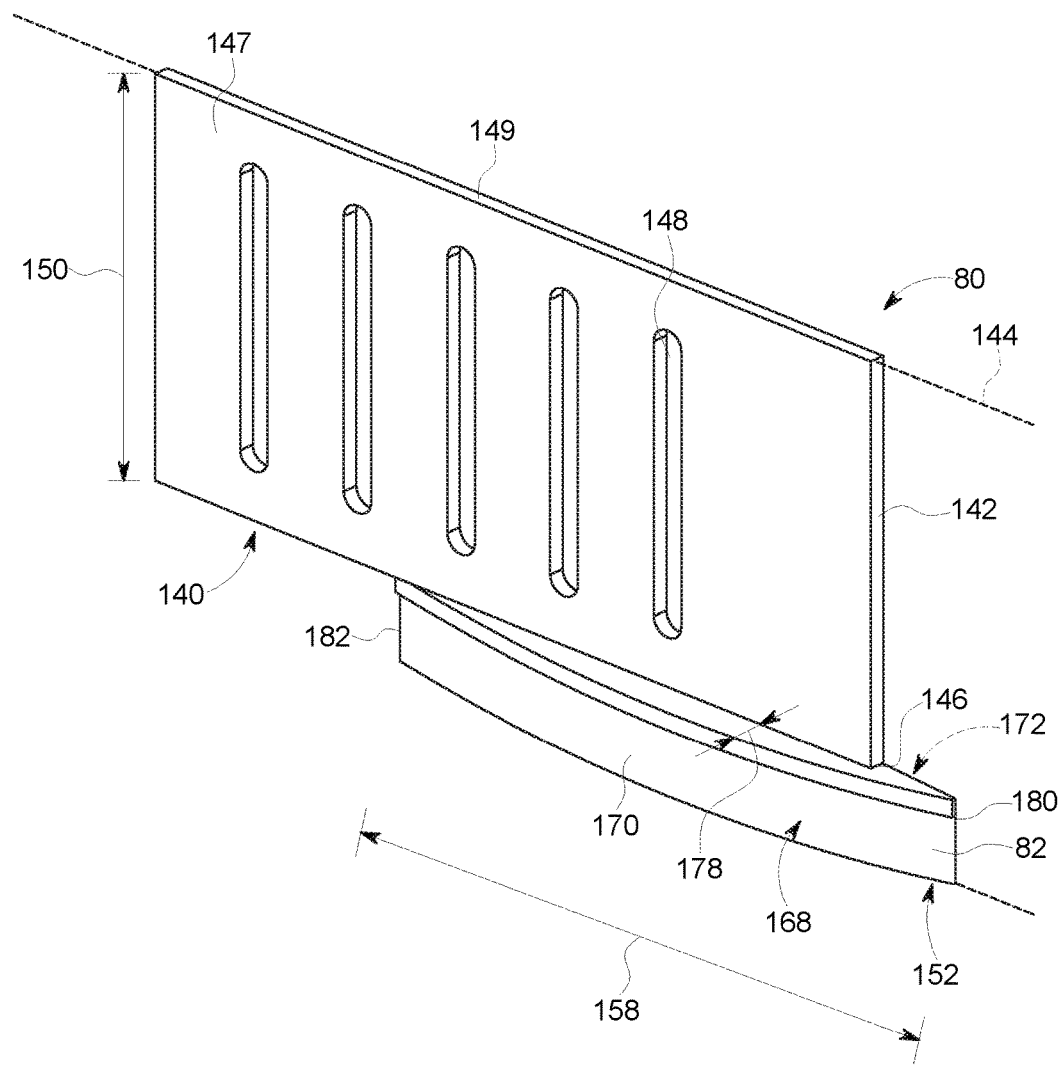
FIG. 3 is a perspective view of the recoating assembly of FIG. 2, in accordance with an embodiment of the present disclosure.

FIG. 3 illustrates an embodiment of the recoating assembly 80 that may be used to evenly distribute the powder particles 52 laterally and radially in a manner that allows disruptions in previously deposited build layers 54 to be filled in to mitigate propagation of the disruptions in subsequent build layers 54. As shown in FIG. 3, the recoating assembly 80 includes the curved recoater blade 82 positioned at a bottom end 140 of a mounting jig 142. For example, the curved recoater blade 82 is coupled to a jig surface 146 along an axis 144 (e.g., horizontal axis) of the recoating assembly 80. The jig surface 146 corresponds to a surface of the jig 142 positioned closest to the surface 120 of the annular build plate 50, as illustrated in FIG. 2. The mounting jig 142 supports and couples the curved recoater blade 82 to a supporting structure of the workstation 100 shown in FIG. 2. In certain embodiments, the curved recoater blade 82 may be removably coupled to the mounting jig 142. As such, an operator of the continuous additive manufacturing system 10 may remove the attached curved recoater blade 82 from the mounting jig 142 and replace it with another recoater blade depending on the geometry of the article 30 to be printed, wear of the attached curved recoater blade 82, and/or a radius of the annular build plate 50 illustrated in FIG. 2. The replacement recoater blade may have the same or different geometry as the previously attached recoater blade 82.

The mounting jig 142 and the curved recoater blade 82 may be manufactured from, for example, stainless steel, steel, titanium, titanium alloys, aluminum, aluminum alloys, copper alloys, ceramic, polymers, resins (e.g., rubber, silicone, polycarbonate, polyvinylchloride, epoxy resins, or the like) or any other suitable material and combinations thereof. In one embodiment, the mounting jig 142 and the curved recoater blade 82 are manufactured from the same material. In other embodiments, the mounting jig 142 and the curved recoater blade 82 are manufactured from different materials. The curved recoater blade 82 may be a hard (e.g., rigid) recoater blade or a soft (flexible) recoater blade. The soft recoater blade may have a higher degree of flexibility relative to the hard recoater blade. For example, the hard recoater blade may be fabricated from hard materials such as the metals, metal alloys, ceramic materials, and resins discussed above. In one embodiment, the hard recoater blade may be manufactured from the powder particles 52 or from the same material as the powder particles 52. In this way, portions of the curved recoater blade 82 that may flake off due to normal wear of the curved recoater blade 82 do not contaminate the build layer 54 with a different material. The soft recoater blade may be fabricated from flexible materials such as silicone, rubber, or any other suitable flexible polymeric material and/or fibers. In certain embodiments, the soft recoater blade may include bristles (e.g., silicone, nylon, silk, wool, or any other suitable synthetic and/or natural fiber).

The curved recoater blade 82 may be coupled to the mounting jig 142 via any suitable means. For example, the curved recoater blade 82 may be coupled to the mounting jig 142 via an adhesive (e.g., cyanoacrylates, polyurethane, epoxy, or the like), welding, fasteners (e.g., screws, bolts, clips, etc.), or any other suitable coupling technique. Attaching the curved recoater blade 82 using fasteners may facilitate removal of the attached curved recoater blade 82. As discussed above, an operator of the continuous additive manufacturing system 10 may switch between recoater blades during manufacturing of the article 30. By using fasteners to couple the curved recoater blade 82 to the mounting jig 142, removal of an existing curved recoater blade 82 and replacement with a similar or different recoater blade (e.g., a replacement recoater blade or a blade with a different shape and/or hardness) may be achieved. In other embodiments, the recoating assembly 80 may be molded or printed such that the mounting jig 142 and the curved recoater blade 82 form a single continuous structure with no removable or adjoined parts.

In one embodiment, the recoating assembly 80 may be coupled to a vibration source (e.g., electrical or acoustic). For example, the vibration source may be coupled to the mounting jig 142 or the curved recoater blade 82. The vibration source creates vibrations along the curved recoater blade 82. The vibrations may fluidize the powder particles 52 such that the powder particles 52 may easily flow and be distributed along the surface 120 to form the build layer 54.

The mounting jig 142 includes a supporting wall 147 extending between the bottom end 140 and a top end 149 along the axis 144. In the illustrated embodiment, the supporting wall 147 has a rectangular shape. However, in other embodiments, the shape of the supporting wall 147 may be triangular, polygonal, square, or any other suitable shape that supports the curved recoater blade 82 and facilitates coupling of the recoating assembly 80 to the supporting structure of the workstation. The supporting wall 147 includes one or more openings 148 that couple the recoating assembly 80 to complimentary coupling members (e.g., a peg, protrusion, hook, or the like) on the supporting structure of the workstation 100. The openings 148 may have any suitable shape that facilitates coupling of the recoating unit 80 to the complimentary coupling member on the workstation 100. For example, the shape of the openings 148 may be square, round, elliptical, polygonal, triangular, or any other suitable shape. In certain embodiments, rather than the openings 148, the mounting jig 142 may have protrusions or pegs that couple to corresponding openings/slots on the support structure of the workstation 100. In other embodiments, the mounting jig 142 may have a combination of protrusions and the openings 148.

In the illustrated embodiment, the openings 148 are shaped in a manner that enables movement of the recoating assembly 80 relative to the annular build plate 50 in the Z-direction 16. As such, the recoating assembly 80 may move toward or away from the annular build plate 50 to position the curved recoater blade 82 on the surface 120 of the annular build plate 50 such that the curved recoater blade 82 can distribute the deposited powder particles 52 and form the build layer 54. For example, as illustrated, the one or more openings 148 are elongated along a dimension 150 (e.g., a vertical dimension) of the mounting jig 142. The elongated configuration of the openings 148 of the illustrated embodiment facilitates adjustment of a distance (e.g., height) of the curved recoater blade 82 relative the annular build plate 50. That is, the elongated configuration allows the recoating assembly 80 to move in the Z-direction 16 to change a distance between a contacting surface 152 of the curved recoater blade 82 and the surface 120 of the annular build plate 50, as best seen in FIG. 2.

For example, in certain embodiments, the build platform 34 illustrated in FIG. 2 may not move in the Z-direction 16 to bring the annular build plate 50 toward or away from the contacting surface 152 of the curved recoater blade 82. Rather, the recoating assembly 80 translocates relative to the annular build plate 50 in the Z-direction 16. Therefore, the openings 148 may allow the recoating assembly 80 to slide in the Z-direction 16. However, in certain embodiments, the recoating assembly 80 is stationary and does not move relative to the annular build plate 50 in the Z-direction 16. As such, the build platform 34 may translocate in the Z-direction to move the annular build plate 50 toward or away from the contacting surface 152 of the curved recoater blade 82. In other embodiments, both the recoating assembly 80 and the build platform 34 move relative to each other in the Z-direction 16.

As illustrated in FIG. 3, the curved recoater blade 82 includes a blade wall 168 having a first face 170 and a second face 172 opposite the first face 170. In the illustrated embodiment, the first face 170 is curved (e.g., arched). Accordingly, a portion of the first face 170 extends away from the supporting wall 147 of the mounting jig 142 a distance 178. The distance 178 varies along the length 158 of the curved recoater blade 82 from a first end 180 to a second end 182 of the curved recoater blade 82 based on a pitch of curvature of the first face 170. In certain embodiments, the second face 172 is straight (e.g., flat, planar, non-curved). In other embodiments, both the first and second face 170, 172, respectively, are curved. For example, one of the first or the second face 170, 172 may be convex (e.g., domed), and the other side 170, 172, respectively, may be concave.

The degree of curvature of the first face 170 along the length 158 of the curved recoater blade 82 may be determined or designed based on the pitch that achieves the desired angle 132. For example, as the pitch of the curvature of the first face 170 increase, the angle 132 decreases, and the radial transport rate of the powder particles 52 by the curved recoater blade 82 increases. The length 158 of the curved recoater blade 82 increases as a function of the pitch. That is, as the pitch of the curvature increases, the angle 132 decreases, and the length 158 of the curved recoater blade 82 increases. Conversely, as the pitch of the curvature of the first face 170 decreases, the radial transport rate of the powder particles 52 increases, due in part to an increase in the angle 132. Therefore, to maintain the curved recoater blade 82 at a suitable length 158 and achieve a desired radial transport rate, the pitch may be selected such that the angle 132 between the curved recoater blade 82 and the tangent 134 at each respective radii 136 is between approximately 10 degrees and approximately 75 degrees.

Unlike traditional recoater blades that are not curved, the disclosed curved recoater blade 82 enables a constant radial transport rate of the powder particles 52, such that the leading edge 84 of the powder particles 52 moves in a straight line, rather than a curved line, along the surface 120 of the annular build plate 50. In this way, disruptions in the containment wall of each respective build layer 54 resulting from uneven distribution of the powder particles 52 may be mitigated. Additionally, the curved recoater blade 82 may reduce the amount of the powder particles 52 dispensed onto the annular build plate 50. For example, when using recoater blades that do not have the disclosed curved geometry to distribute the powder particles 52 onto the annular build plate 50, an excess amount of the powder particles 52 may be dispensed to distribute enough of the powder particles 52 to the regions having the disruptions. However, by using the curved recoater blade 82 disclosed herein, excess powder particles 52 may not be necessary for filling in regions of the build layer 54 having disruptions because the curved recoater blade 82 evenly distributes the powder particles 52 in a manner that mitigates formation and propagation of the disruptions in subsequent build layers 54. Moreover, the constant radial transport rate promoted by the curved recoater blade 82 may result in a constant smoothness (e.g., leveling) of the build layer 54 compared to recoater blades that are not curved.

Figure 4:
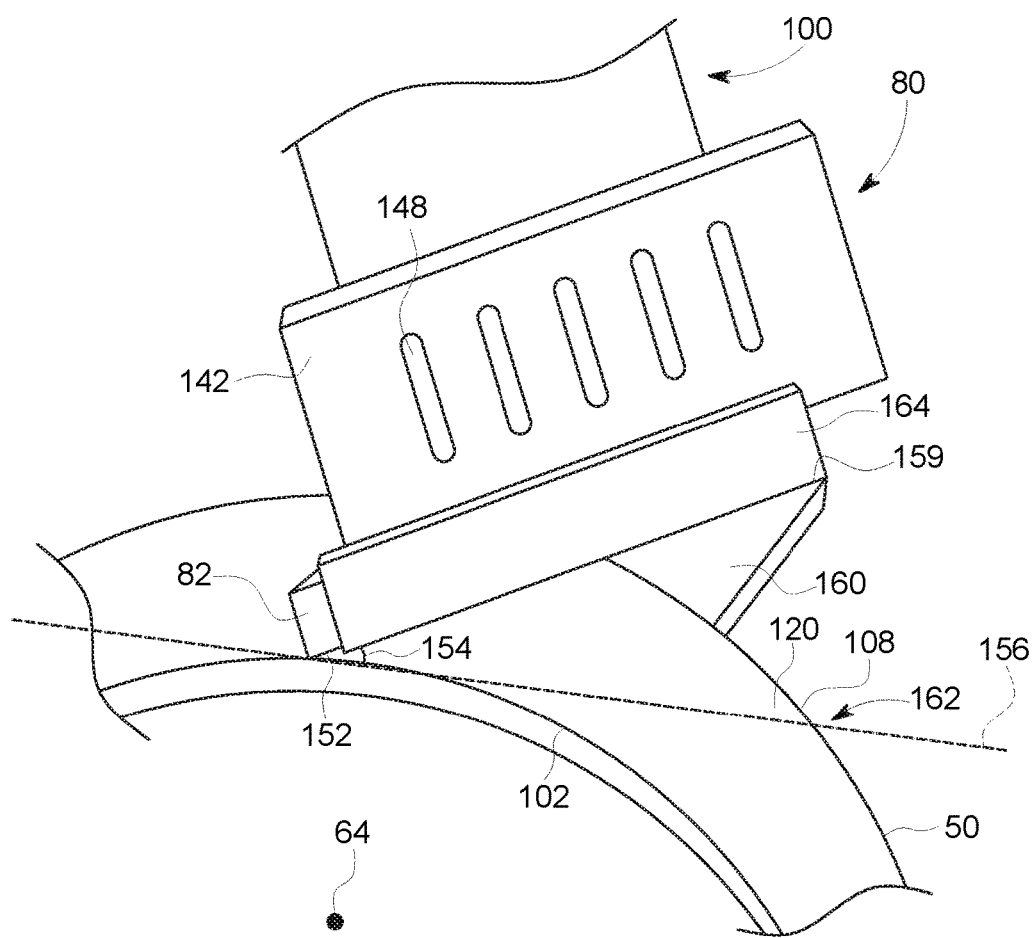
FIG. 4 is a perspective view of a portion of the build platform of FIG. 2 and a jig alignment tool, whereby a jig alignment tool is used to align the recoating assembly onto a build plate of the build platform.

The recoating assembly 80 is positioned on the supporting structure of the respective workstation 100 such that the curved recoater blade 82 is positioned at an angle relative to the annular build plate 50. For example, as illustrated in FIG. 4, the recoating assembly 80 is positioned at an angle 154 relative to a tangent 156 at the inner radius 102 of the annular build plate 50. A length 158 (e.g., horizontal length) of the curved recoater blade 82 is orthogonal to the platform axis 64 (e.g., the Z-axis 16) of the continuous additive manufacturing system 10. A jig alignment tool 159 may be used to position and align the recoating assembly 80 before securing the mounting jig 142 to the supporting structure of the respective workstation 100. The jig alignment tool 159 includes a base 160 that is positioned against (e.g., abuts) an outer side wall 162 of the annular build plate 50 at the outer radius 108. The base 160 aligns an extending arm 164 of the jig alignment tool 159 at the desired angle 154. The recoating assembly 80 may be positioned against the extending arm 164 such that the contact surface 152 of the curved recoater blade 82 is adjacent to the surface 120 of the annular build plate 50. In this way, the jig alignment tool 159 may be set to a desired angle 154 relative to the tangent 156 to set the angle 132 of the curved recoater blade 82 relative to the tangent 134 at each radii 136 of the annular build plate 50.

As discussed above, the angle 132 of a recoater blade relative to the tangent 134 at each radii 136 of the annular build plate 50 affects how the powder particles 52 are distributed onto the surface 120. If the angle 132 varies at each radii 136 between the inner radius 102 and the outer radius 108 of the annular build plate 50, the rate at which the powder particles 52 are distributed will also vary radially along the surface 120. The radial variation in the distribution rate of the powder particles 52 results in uneven distribution of the powder particles 52. The shape of the recoater blade affects the angle 132, and hence how the powder particles 52 are distributed. Therefore, to mitigate radial variations in the angle 132 along the annular build plate 50, it is presently recognized that it is advantageous for the shape of the recoater blade should have a curvature, as shown by the curved recoater blade 82 in FIG. 3.

Figure 5:
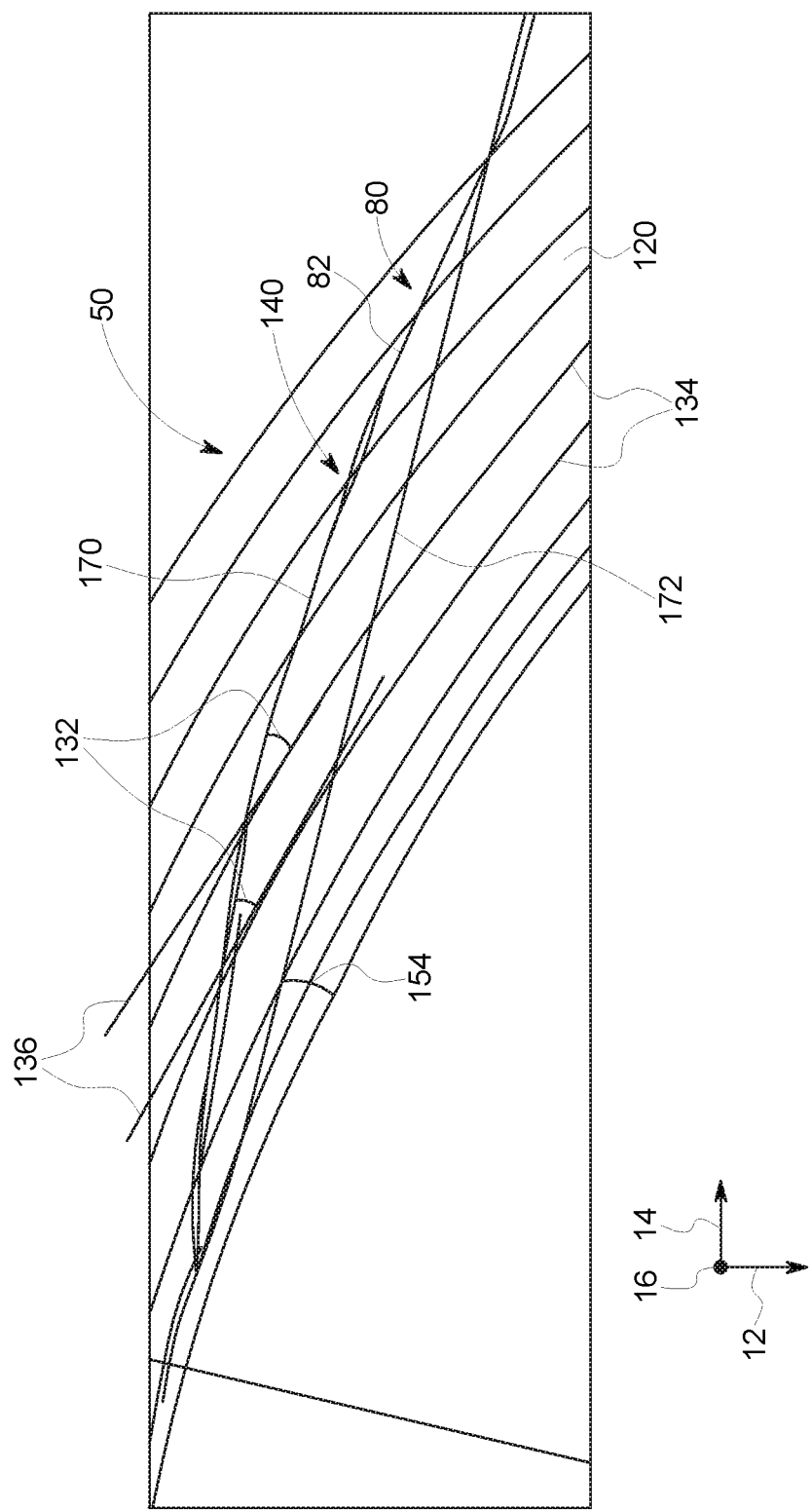
FIG. 5 is a schematic top view of the build platform and a portion of recoating assembly of FIG. 3, whereby the curved recoater blade forms a constant angle relative to a tangent at each radii of the build platform, in accordance with an embodiment of the present disclosure.

The curvature of the curved recoater blade 82 creates a constant angle 132 between the contact surface 152 of the curved recoater blade 82 and the tangent 134 at each radii 136 of the annular build plate 50. For example, FIG. 5 is a schematic top view of the recoater blade 82 positioned along the surface 120 of the annular build plate 50. The curved recoater blade 82 is oriented such that the curved recoater blade 82 forms the angle 154 between the second face 172 and the inner radius 102 of the annular build plate 50. The first face 170 of the curved recoater blade 82 faces toward the outer radius 108 of the annular build plate 50 and forms the substantially constant angle 132 relative to the tangent 134 at each radii 136 of the annular build plate 50. As such, the rate at which the curved recoater blade 82 distributes the powder particles 52 onto the surface 120 of the annular build plate 50 is constant, resulting in an even radial distribution. For practical implementation, the curved recoater blade 82 may be constructed as a single continuous curve, as multiple connected linear segments that effect a continuous curve (e.g. a spline), or as a series of multiple disconnected linear segments that trail one another to effect a continuous curve.

In certain embodiments, the curved recoater blade 82 may be part of a kit of various recoater blades having different geometries (e.g., straight and curved). For example, the kit may include curved recoater blades 82 that each have a curve with a different pitch. For example, each curved blade 82 in the kit may have a curve with a pitch between approximately 10 and approximately 75 degrees to the tangent at a radius. The operator of the continuous additive manufacturing system 10 may select at least one recoater blade from the various recoater blades in the kit based on printing parameters and/or the geometry of the article 30 to be printed.

Figure 6:
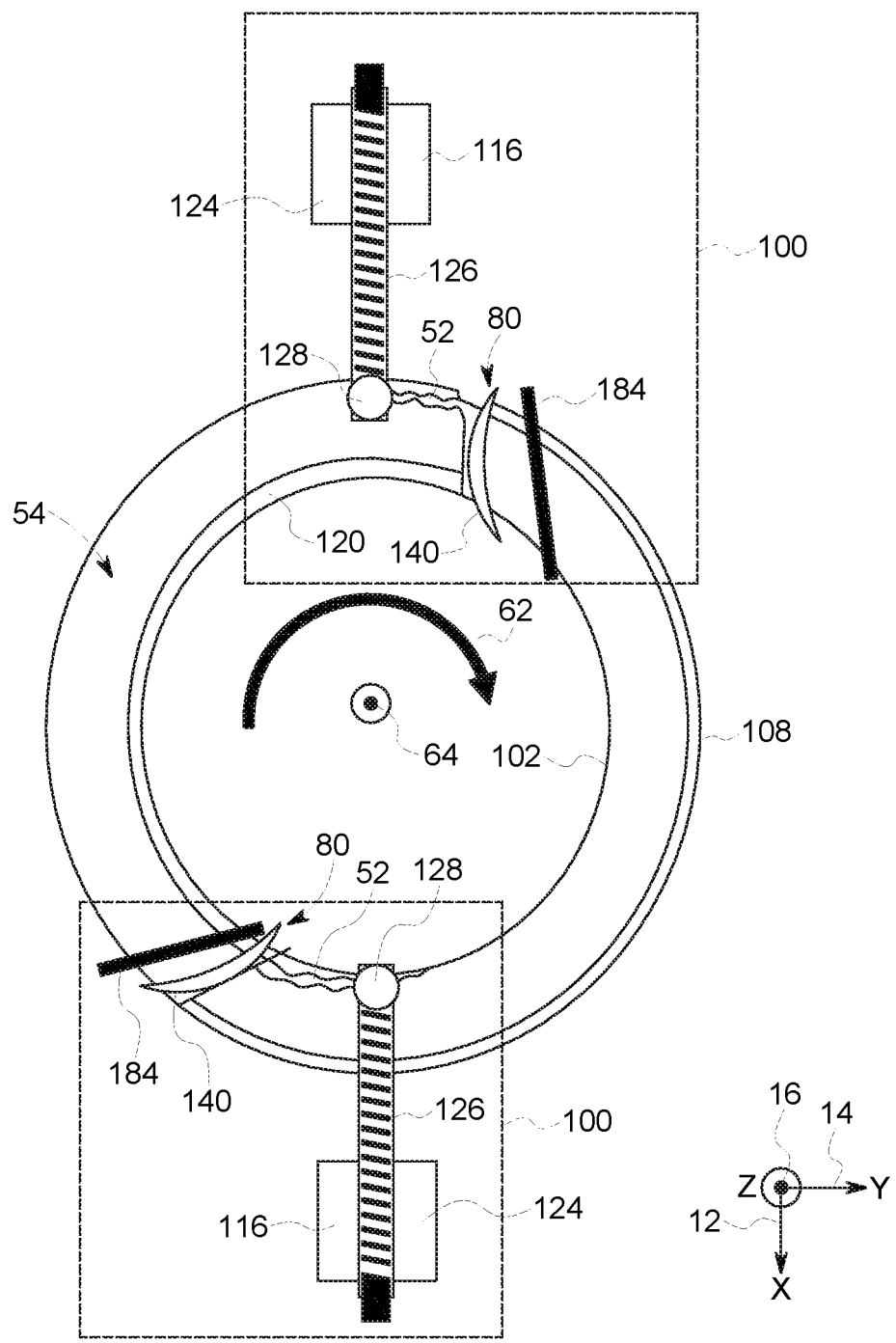
FIG. 6 is a schematic top view of the build platform and workstation of the continuous additive manufacturing system of FIG. 1, the workstation having a recoating assembly including the curved recoater blade and a straight recoater blade, in accordance with an embodiment of the present disclosure.

As discussed above, the recoating assembly 80 distributes, meters, and smoothes the powder particles 52 on the surface 120 of the annular build plate 50 to form the build layer 54 during use of the continuous additive manufacturing system 10. In certain embodiments, the continuous additive manufacturing system 10 may include a combination of recoater blades within a single workstation 100. For example, FIG. 6 is a top schematic view of the continuous additive manufacturing system 10 having a multi-stage recoating configuration. In the illustrated embodiment, each workstation 100 includes a coarse recoater blade (e.g., the curved recoater blade 82) and a fine recoater blade (e.g., a straight recoater blade 184). However, in certain embodiments, the continuous additive manufacturing system 10 includes one or more than two workstations 100. In one embodiment, one workstation 100 may include both recoater blades 82, 184 and the other workstation 100 includes either the curved recoater blade 82 or the straight recoater blade 184. By having both coarse and fine recoater blades within the workstation 100, distributing, metering, and smoothing of the powder particles 52 may be improved. For example, the curved recoater blade 82 provides a substantially even lateral and radial distribution of the powder particles 52 on the surface 120 compared to the straight recoater blade 184, as discussed above. However, the straight recoater blade 184 may be better for metering and/or smoothing of the powder particles 52 compared to the curved recoater blade 82. Therefore, using both the recoater blades 82, 180 to form the build layer 54 may result in an evenly distributed and flat (e.g., level) build layer 54 that is suitable for building the article 30 with a desired geometry and quality.

Alternatively, the curvature of the curved recoater blade 82 can be purposefully designed to deliver non-uniform distribution of the powder. For example, it may be desirable for the deposited powder to be recirculated initially with a low lateral velocity in order to even out the non-uniform deposits of powder. As the powder moves along the lateral direction of the curved recoater blade 82, its radial velocity may be increased in order to increase the distribution rate (e.g. to fill in after disruptions in the powder bed). In certain embodiments, this could be accomplished using a recoater blade with uniform curvature that is pitched at a specific angle relative to the tangent at a radius. In another embodiment, this could be accomplished using a recoater blade with a non-uniform curvature that continuously varies along its length (e.g. as a ~ (tilde) shape) that is angled relative to the tangent at a radius.

In certain embodiments, both the recoater blades 82, 180 are mounted on the mounting jig 142. The blades 82, 180 may be mounted at different height settings along the dimension 150 of the mounting jig 142. For example, the curved recoater blade 82 may be mounted onto the bottom end 140 and the straight recoater blade 184 may be mounted on the supporting wall 147 shown in FIG. 3, such that a distance between the contacting surface 152 of the curved recoater blade 82 and the surface 120 of the annular build plate 50 is less than a distance between a respective contacting surface of the straight recoater blade 184 and the surface 120. However, in other embodiments, the distance between the contacting surface 152 and the surface 120 is greater than or equal to the respective distance between the contacting surface of the straight blade 184 and the surface 120.

In one embodiment, each respective recoater blade 82, 184 is mounted onto its own dedicated mounting jig 142. That is, the recoater blades 82, 184 do not share the same mounting jig 142. In the illustrated embodiment, the straight recoater blade 184 is positioned downstream (e.g., away from the particle delivery unit 116 in the direction 62) of the curved recoater blade 82. However, in other embodiments, the straight recoater blade 184 may be positioned upstream of the curved recoater blade 82. That is, the straight recoater blade 184 may be disposed between the curved recoater blade 82 and the feed nozzle 128.

As discussed above, the recoating assembly disclosed herein may be used in continuous additive manufacturing systems to print an article, such as a metal machine part. The disclosed recoating assembly includes a curved recoater blade mounted on a mounting jig that may be used to adjust a height of the curved recoater blade relative to a build plate of the continuous additive manufacturing system. The curved configuration of the curved recoater blade results in a substantially constant angle between the curved recoater blade and a tangent at each radii along the build plate. As such, the radial and lateral transport rate of powder particles onto the build plate of the continuous additive manufacturing system is increased, which causes a leading edge of the powder particles to move in a substantially straight line. Accordingly, the powder particles are evenly distributed on the working surface. In this way, disruptions in the containment walls and/or build layers of the article of interest may not propagate into subsequent build layers. Additionally, more complex containment wall and article geometries may be achieved with continuous additive manufacturing techniques.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An additive manufacturing system for printing an article, comprising:
 an annular build plate having a build surface between an inner radius and an outer radius that is configured to receive powder particles;
 a recoating assembly configured to distribute the powder particles onto the build surface to form a build layer of the article, wherein the recoating assembly comprises:
  a support jig comprising a first end, a second end, and a support wall extending between the first and second ends; and
  a curved recoater blade coupled to the second end and extending along at least a portion of a length of the support wall, wherein a shape of the curved recoater blade defines an angle between the curved recoater blade and a tangent at each radii of the annular build plate that is constant.

2. The additive manufacturing system of claim 1, wherein the angle is between 5 degrees and 50 degrees.

3. The additive manufacturing system of claim 2, wherein the angle is between 15 degrees and 25 degrees.

4. The additive manufacturing system of claim 1, wherein the curved recoater blade comprises a blade wall that forms the shape of the curved recoater blade, the blade wall having a first face configured to engage the powder particles to distribute the powder particles across the build surface and a second face that is opposite the first face, and wherein the first face is curved.

5. The additive manufacturing system of claim 4, wherein the second face is flat.

6. The additive manufacturing system of claim 1, wherein the support wall of the support jig comprises a coupling feature configured to couple to a complimentary feature disposed on a support structure of the additive manufacturing system.

7. The additive manufacturing system of claim 6, wherein the coupling feature comprises one or more openings, one or more protrusions, or both.

8. The additive manufacturing system of claim 1, wherein the curved recoater blade is removably coupled to the support jig.

9. The additive manufacturing system of claim 1, comprising a second recoater blade positioned adjacent to the curved recoater blade, wherein the second recoater blade comprises a second wall having a first face and a second face, and wherein the first and second faces are flat.

10. The additive manufacturing system of claim 1, wherein the support jig is configured to move relative to the annular build plate along a centerline axis of the additive manufacturing system.

11. The additive manufacturing system of claim 1, wherein the curved recoater blade is rigid.

12. The additive manufacturing system of claim 1, wherein the curved recoater blade is flexible.

* * * * *